(No Model.)
S. J. COLLIER, Dec'd.
P. B. TURPIN, Administrator.
MEANS FOR OBTAINING TWO SPEEDS IN BICYCLES.
No. 544,267. Patented Aug. 6, 1895.
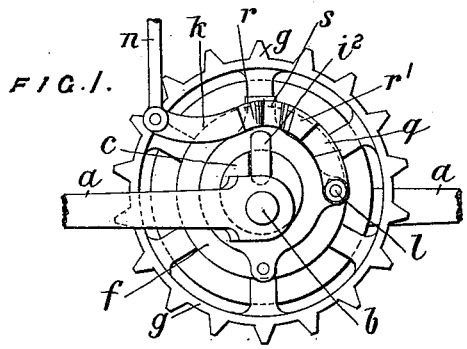
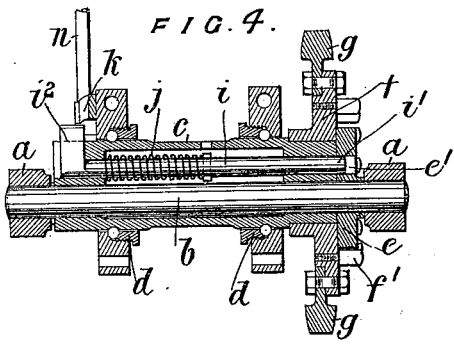
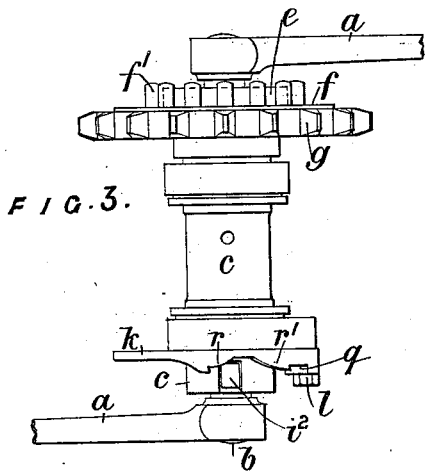
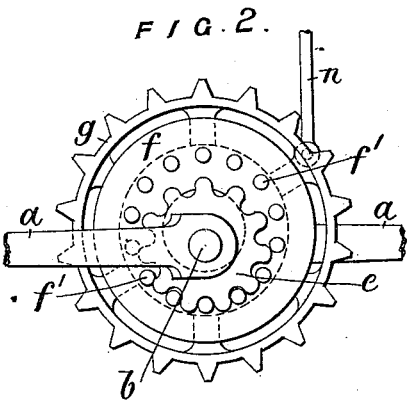
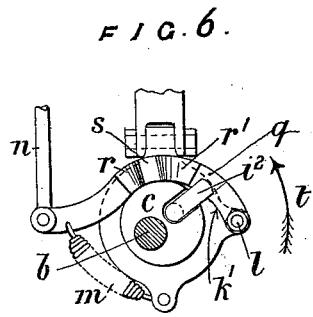
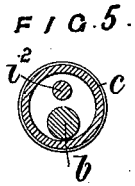
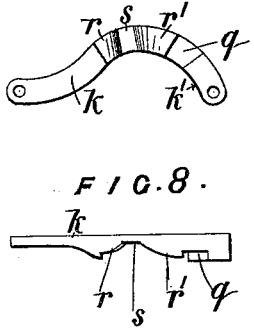
WITNESSES.
Jos. A. Ryan
Edw. W. Byrn
INVENTOR:
Perry B. Turpin
Administrator of Estate of
Septimus John Collier Deceased.
By Munn & Co
ATTORNEYS

UNITED STATES PATENT OFFICE.

PERRY B. TURPIN, OF WASHINGTON, DISTRICT OF COLUMBIA, ADMINISTRATOR OF SEPTIMUS J. COLLIER, DECEASED.

MEANS FOR OBTAINING TWO SPEEDS IN BICYCLES.

SPECIFICATION forming part of Letters Patent No. 544,267, dated August 6, 1895.

Application filed April 8, 1895. Serial No. 544,971. (No model.) Patented in England May 29, 1889, No. 8,893.

*To all whom it may concern:*

Be it known that SEPTIMUS JOHN COLLIER, late of Old Hall, Whitefield, Manchester, in the county of Lancaster, England, deceased, invented or discovered new and useful Improved Means for Obtaining Two Speeds in Bicycles, Tricycles, and other Velocipedes, (for which he obtained Letters Patent in the following country—namely: Great Britain—dated May 29, 1889, No. 8,893,) of which the following is a full, clear, and exact description.

This invention relates to a two-speed driving mechanism for bicycles, and has for its object to enable the driving mechanism to be geared for speed or "geared down" for power at the will of the rider while the machine is running.

Reference is to be had to the accompanying drawings, forming part of this specification, in which—

Figures 1 and 2 are opposite side elevations. Fig. 3 is a plan, and Fig. 4 a longitudinal axial section, of the improved two-speed driving mechanism as geared for speed. Fig. 5 is a cross-section of the crank-axle and the hollow-axle in which it is journaled eccentrically. Fig. 6 is an elevation of the axle-locking mechanism, shown separately in the position when geared down for power; and Figs. 7 and 8 are face and edge views of the cam by which the locking-bolt is engaged.

The same letters of reference indicate the same parts in all the figures.

The invention will be described as applied to a safety-bicycle, but it is also applicable to other central-geared velocipedes.

$a$ are the pedal-cranks keyed on the ends of the crank-axle $b$, which is mounted to revolve in an eccentric bore within a larger axle $c$, the axes of the two axles being parallel and the axle $c$ being mounted to revolve in ball or other bearings $d$ secured to the frame of the machine.

$e$ is a toothed pinion keyed upon the crank-axle $b$ and meshing with an internal toothed wheel $f$, whose teeth are formed preferably by a circle of studs $f'$ fixed in the disk $f$. The disk $f$ is mounted to rotate upon the axle $c$, and it carries the sprocket-wheel $g$, upon which the driving-chain runs. Mounted to slide longitudinally in the axle $c$ is a bolt $i$, adapted to lock pinion $e$ to the axle $c$ and prevent it rotating in relation thereto by its end $i'$ entering a hole $e'$ in the pinion when it comes opposite thereto. The bolt $i$ is constantly pressed in the direction of engagement by a spiral spring $j$, and it is retracted and held out of engagement by its return end $i^2$ being acted on by the notched cam $k$ pivoted to the frame of the machine and acting as hereinafter described.

The eccentricity of the axle $b$ with regard to the axle $c$ is sufficient to enable the required difference of diameter of the pinion $e$ and internal gear-wheel $f$ to be obtained. These two are constantly in mesh with each other, but do not always act as gear-wheels.

When the driving mechanism is geared for speed, which is the normal position, and that shown in Fig. 4, the cam $k$ is moved out of engagement with the end $i^2$ of the bolt, as shown in Fig. 1, thereby allowing the end $i'$ of the latter to enter the hole $e'$ of the pinion $e$ and so lock said pinion to the axle $c$ as to cause the axle $b$, pinion $e$, and axle $c$ to rotate together as one, the axis of the axle $c$ being in that case the axis about which the pedals revolve in their orbit. As the pinion $e$ cannot revolve about its own axis, the pinion $e$ and internal wheel $f$ remain in engagement without revolving relatively to each other, but act like the two members of a clutch, revolving together with each other and the axle $c$ at the same speed as the pedals revolve about the axis of axle $c$.

In order to gear down the mechanism for power, the bolt $i$ is retracted, so as to allow pinion $e$ to revolve with axle $b$ upon its own axis while the axle $c$ is held stationary. The pinion $e$ then drives the wheel $f$ in the manner of spur-gear and causes it to revolve upon the axle $c$, the chain-sprocket thus revolving at a slower speed than the pedals in the inverse proportion of the diameters of pinion $e$ and wheel $f$. The mechanism by which the bolt is thus retracted consists of the cam $k$, pivoted at $l$ to the frame and acted on by a spring $m$, Fig. 6, tending to throw it into acting position, a rod $n$, connected to the cam and to a hand-lever near the steering-bar, being provided to raise and hold the cam out of operative position, as in Fig. 1. The cam $k$ has a notch $q$, adapted to receive the lug $i^2$ of the locking-bolt $i$, and inclines $r\ r'$, which act on the lug $i^2$, as hereinafter explained. The pivoted end of the cam is situated at such a radius from the axis of axle $c$ that the lug $i^2$ can pass within such pivoted end and revolve with said axle free of the cam when the same is in the position shown when in Fig. 1, the cam being preferably so curved as when in that position to be approximately concentric with axle $c$. When the cam is moved to the position Fig. 6 its inner edge is eccentric to the axle $c$ and the thin part at S is close to the axle $c$, so that as the lug $i^2$ revolves in the direction of the arrow $t$ its end will strike against the inner edge $k'$ of the cam and swing it outward on its pivot $l$ until it arrives opposite the gap $s$ between the inclines $r\ r'$, whereupon the cam will be swung inward again by its spring and fall behind the lug $i^2$, so that the latter will lie in the gap $s$. The continued rotation of the axle $c$ then causes the lug $i^2$ to bear against and ride up the incline $r$, whereby the bolt $i$ is withdrawn from engagement with pinion $e$. The latter will then be revolved by the pedals relatively to axle $c$, so that the hole $e'$ passes out of alignment with the bolt and the strains transmitted by the mechanism then cause the axle $c$ to revolve in the direction opposed to the arrow $t$ and the lug $i^2$ to ride down the incline $r$ across the gap $s$ and up the incline $r'$ until it falls into the notch $q$, by which it is prevented from turning in either direction, while the opposite end of the bolt is prevented from protruding into engagement with the pinion $e$. As the lug $i^2$ is always engaged in the slot in the end of axle $c$, it follows that by the engagement of the lug $i^2$ in notch $q$ the axle $c$ will be held stationary in its bearings $d$. In order to again gear the driving mechanism for speed the cam $k$ is withdrawn, as in Fig. 1, to disengage the lug $i^2$ from the notch $q$ and permit the bolt $i$ to be thrown by its spring $j$ into engagement with pinion $e$, which occurs when the hole $e'$ comes opposite the end of the bolt.

It is to be observed that the relative angular position of the pedal-cranks $a$ and of the hole $e'$ in pinion $e$ should be such that when the mechanism is geared for speed the cranks are perpendicular to the common plane of the axes of the axles $b$ and $c$; otherwise when the pedals revolve as one with the axle $c$ about its axis the orbit of one pedal would be of greater radius than that of the other.

The number of teeth in the pinion $e$ and the number of the studs $f'$ secured in the wheel $f$ and intended to act as the teeth of an "internal wheel," as hereinbefore described, will require to be adapted to the purpose for which the machine is to be used, and to the size of the driving-wheel and the relative sizes of the chain-wheels of such machine.

It will be found that for use with a driving-wheel which is geared to run as a "sixty-inch wheel" a pinion $e$, provided with twelve teeth, and a wheel $f$, provided with fifteen studs, are suitable for ordinary use.

Having thus described the invention, what is claimed as new, and desired to be secured by Letters Patent, is—

1. A two-speed driving mechanism for cycles, which mechanism consists in the combination of a crank axle revolubly mounted eccentrically in a larger axle mounted in bearings in the machine frame, a spur pinion fast on the crank axle, a combined chain sprocket wheel and internal toothed wheel mounted concentrically upon the larger axle and in gear with the pinion on the crank axle, and means for locking the two axles together so as to cause them and the spur gears to normally revolve together about the axis of the larger axle at the same angular velocity with the pedals, and chain sprocket wheel and means for temporarily unlocking the axles, and at the same time locking the large axle to the frame, substantially as specified.

2. A two-speed driving mechanism for cycles, which mechanism consists in the combination of a crank axle mounted eccentrically in a larger axle mounted in bearings in a machine frame, a spur pinion fast on the crank axle, a combined chain sprocket wheel and internal toothed wheel mounted concentrically upon the larger axle and in gear with the pinion on the crank axle, means for locking the two axles so as to cause them and the spur gears to revolve together as one, and means substantially as described for temporarily unlocking them and of locking the larger axle to the frame, so as to cause the crank axle and its pinion to revolve about their own axis, and the internal toothed chain sprocket wheel to revolve at a lesser angular velocity about the stationary axle when the machine is to be "geared down" for power, as described.

3. A two-speed driving mechanism for cycles, which mechanism consists in the combination of a crank axle mounted eccentrically in a larger axle mounted in bearings in the machine frame, a spur pinion fast on the crank axle, a combined chain sprocket wheel and internal toothed wheel mounted concentrically upon the larger axle and in gear with the pinion on the crank axle, a spring-pressed bolt adapted to slide longitudinally on the larger axle and to engage at one end with a hole in the pinion, an outwardly projecting lug on the other end of the bolt engaged in a recess in the larger axle, an arm having on its outer face oppositely inclined cam surfaces, an intermediate recess, and a notch, the arm being pivoted to the frame and adapted to be actuated by the said lug and by a spring so as to bring the cam inclines into position to act on the lug for disengaging the bolt from the pinion and engaging the lug in the notch of the cam, substantially as specified.

PERRY B. TURPIN,
Administrator of the estate of Septimus John Collier, deceased.

Witnesses:
SOLON C. KEMON,
H. J. ROBINSON.